US007747462B2

(12) United States Patent
Ohlsen et al.

(10) Patent No.: US 7,747,462 B2
(45) Date of Patent: Jun. 29, 2010

(54) METHOD AND SYSTEM FOR GATHERING AND REPORTING DATA ASSOCIATED WITH A CARDHOLDER'S USE OF A PREPAID DEBIT CARD

(75) Inventors: Taylor Ohlsen, Denver, CO (US); Jason Duval, Parker, CO (US); Tim Birk, Lakewood, CO (US)

(73) Assignee: Springbok Services, Inc., Englewood, CO (US)

( * ) Notice: Subject to any disclaimer, the term of this patent is extended or adjusted under 35 U.S.C. 154(b) by 17 days.

(21) Appl. No.: 12/146,990

(22) Filed: Jun. 26, 2008

(65) Prior Publication Data

US 2009/0012844 A1    Jan. 8, 2009

Related U.S. Application Data

(60) Provisional application No. 60/947,608, filed on Jul. 2, 2007, provisional application No. 60/950,255, filed on Jul. 17, 2007.

(51) Int. Cl.
*G06Q 30/00* (2006.01)
(52) U.S. Cl. .................. 705/14.13; 705/14.1; 705/10
(58) Field of Classification Search ............. 705/14.13, 705/14.1, 10, 39, 41
See application file for complete search history.

(56) References Cited

U.S. PATENT DOCUMENTS

| 6,173,267 B1* | 1/2001 | Cairns ......................... 705/14 |
| 2003/0061132 A1* | 3/2003 | Yu et al. ...................... 705/30 |
| 2005/0125292 A1* | 6/2005 | Kassab et al. ................ 705/14 |
| 2005/0177496 A1* | 8/2005 | Blagg et al. .................. 705/39 |
| 2005/0284932 A1* | 12/2005 | Sukeda et al. ............... 235/383 |
| 2007/0150352 A1* | 6/2007 | Kelly-Frank et al. ......... 705/14 |
| 2008/0288340 A1* | 11/2008 | Pearson et al. ............... 705/14 |

OTHER PUBLICATIONS

Srikumar, Krishnamoorthy and Bharat Bhasker. "Applications of recommender systems in target selection." Journal of Targeting, Measurement and Analysis for Marketing 13.1 (2004): 61-69. (9 pages).*
Ohana Companies News Story; Paybefore News Story, web article located at www.everybodywins.com dated May 10, 2008 and downloaded on Sep. 18, 2008, 3 pgs.

* cited by examiner

*Primary Examiner*—James P Trammell
*Assistant Examiner*—Elda Milef
(74) *Attorney, Agent, or Firm*—Cooley LLP

(57) ABSTRACT

A method and system for gathering and reporting data associated with a cardholder's use of a prepaid debit card is described. One embodiment receives primary personal data associated with the cardholder in connection with the issuance to the cardholder of the prepaid debit card; causes a financial institution to issue the prepaid debit card; causes a card fulfillment process to be performed; causes the prepaid debit card loaded with a predetermined monetary value to be distributed to the cardholder; receives secondary personal data associated with the cardholder; processes one or more transactions initiated by the cardholder with the prepaid debit card; correlates, in a computerized data processing system, the primary and secondary personal data with transactional data associated with the one or more transactions to generate correlated data; and grants an authorized entity access to at least a portion of the correlated data on an aggregated and non-personally-identifiable basis.

21 Claims, 8 Drawing Sheets

US 7,747,462 B2

METHOD AND SYSTEM FOR GATHERING AND REPORTING DATA ASSOCIATED WITH A CARDHOLDER'S USE OF A PREPAID DEBIT CARD

PRIORITY

The present application claims priority to commonly owned and assigned Application No. 60/947,608, entitled Method and System for Capturing and Analyzing Cardholder Data to Support Targeted Promotions, filed on Jul. 2, 2007; and Application No. 60/950,255, entitled Method and System for Capturing and Analyzing Cardholder Data to Support Targeted Promotions, filed on Jul. 17, 2007; both of which are incorporated herein by reference in their entirety.

FIELD OF THE INVENTION

The present invention relates generally to prepaid debit cards. In particular, but not by way of limitation, the present invention relates to methods and systems for gathering and reporting data associated with a cardholder's use of a prepaid debit card.

BACKGROUND OF THE INVENTION

The use of prepaid debit cards in commerce has increased significantly over the past several years. Prepaid debit cards are marketed and used in a variety of ways. Some common types of prepaid debit cards include, without limitation, incentive cards associated with commercial promotions, general-purpose reloadable cards, and payroll cards.

Regardless of the particular type of prepaid debit card, a prepaid-debit-card program sponsor such as a promotional company or a client of a promotional company, a program manager, or an employer, would like to know how cardholders are using their prepaid debit cards. Such information would allow the program sponsor to determine how to improve future prepaid-debit-card programs. Third parties unaffiliated with a prepaid-debit-card program may also desire access to card-usage data. Unfortunately, current prepaid-debit-card processing platforms do not provide program sponsors or unaffiliated third parties with sufficient visibility into how various demographic groups of cardholders are using their prepaid debit cards.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The present invention can provide a method and system for gathering and reporting data associated with a cardholder's use of a prepaid debit card. One illustrative embodiment is a method for gathering and reporting data associated with a cardholder's use of a prepaid debit card, the method comprising receiving primary personal data associated with the cardholder in connection with the issuance to the cardholder of the prepaid debit card; causing a financial institution to issue the prepaid debit card to the cardholder; causing a card fulfillment process to be performed for the cardholder; causing the prepaid debit card loaded with a predetermined monetary value to be distributed to the cardholder; receiving secondary personal data associated with the cardholder; processing one or more transactions initiated by the cardholder with the prepaid debit card; correlating, in a computerized data processing system, the primary and secondary personal data with transactional data associated with the one or more transactions to generate correlated data; and granting an authorized entity access to at least a portion of the correlated data on an aggregated and non-personally-identifiable basis.

Another illustrative embodiment is a system for gathering and reporting data associated with a cardholder's use of a prepaid debit card, the system comprising at least one processor; and a memory containing a plurality of program instructions configured to cause the at least one processor to correlate, with transactional data associated with one or more processed transactions initiated by the cardholder using the prepaid debit card, primary and secondary personal data associated with the cardholder to generate correlated data, the primary personal data having been received in connection with issuance to the cardholder of the prepaid debit card by a financial institution, the cardholder having received the prepaid debit card following a card fulfillment process, the secondary personal information having been received following the cardholder's receipt of the prepaid debit card; and grant an authorized entity access to at least a portion of the correlated data on an aggregated and non-personally-identifiable basis.

The methods of the invention can also be implemented, in part, as a plurality of program instructions executable by a processor and residing on a computer-readable storage medium.

These and other embodiments are described in further detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, wherein:

DETAILED DESCRIPTION

In various illustrative embodiments of the invention, authorized entities including, for example, prepaid-debit-card program sponsors ("program sponsors") and unaffiliated third parties are granted access, on an aggregated and non-personally-identifiable basis, to correlated transactional and personal/demographic data associated with cardholders' use of prepaid debit cards. Such correlated data provides valuable information to program sponsors and unaffiliated third parties regarding the success of current prepaid-debit-card programs ("programs") and how future programs and associated marketing initiatives can be made more successful.

In an illustrative embodiment, one or more reports are generated and presented to the authorized entity, each report being generated based on a plurality of filtering criteria that are interactively and dynamically selectable by the authorized entity. Such filtering criteria may include, without limitation, one or more of geographic region, age, gender, marital status, time period, and product or service category.

The principles of the present invention may be applied to a wide variety of prepaid debit cards types, including, without limitation, incentive cards, general-purpose reloadable cards, and payroll cards.

Figure 1:
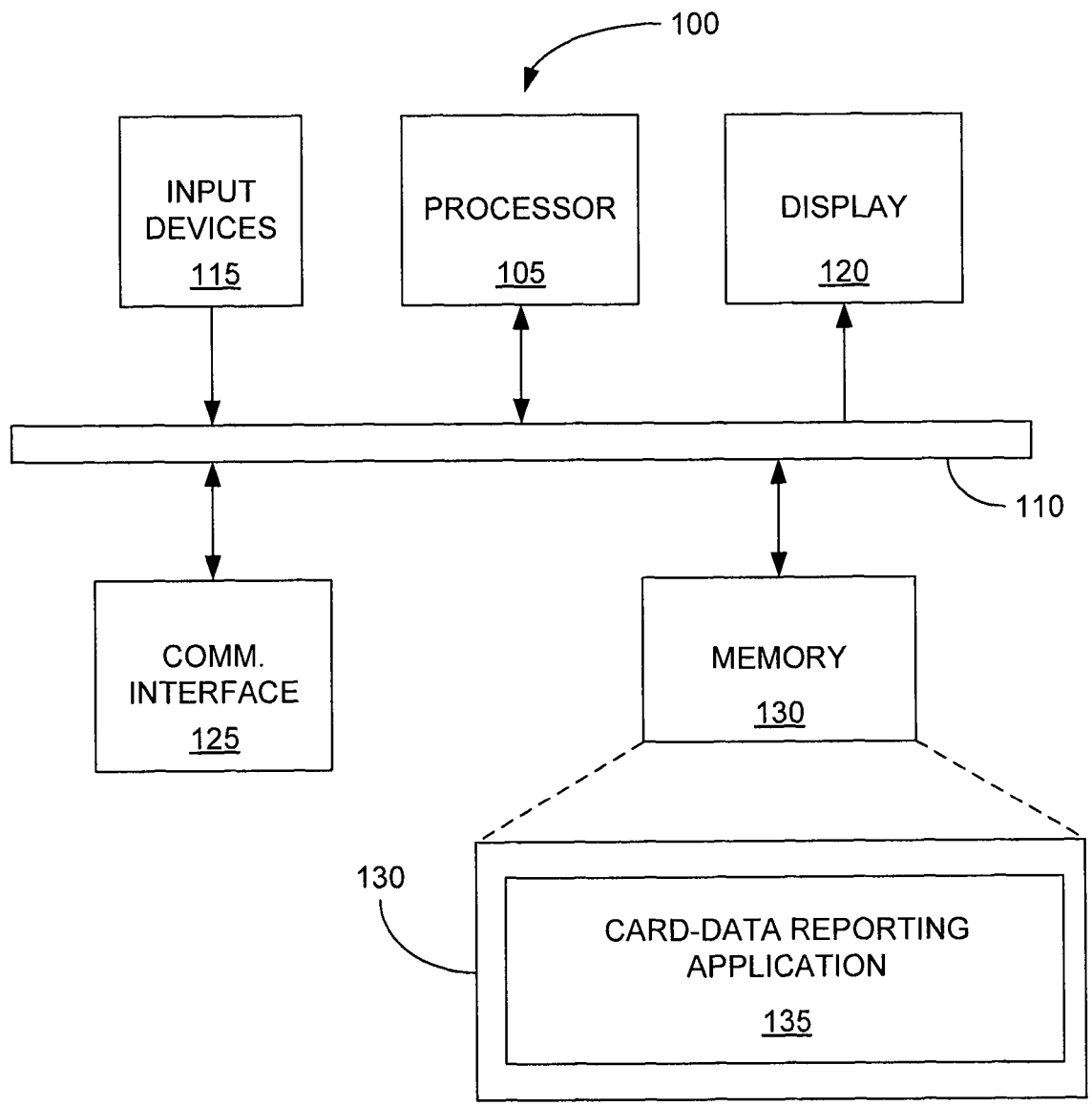
FIG. 1 is a functional block diagram of a computer equipped with a card-data reporting application, in accordance with an illustrative embodiment of the invention.

Referring now to the drawings, where like or similar elements are designated with identical reference numerals throughout the several views, and referring in particular to FIG. 1, it is a functional block diagram of a computer 100 equipped with a card-data reporting application ("application") 135, in accordance with an illustrative embodiment of the invention. Computer 100 may be any computing device capable of running application 135. For example, computer 100 may be, without limitation, a personal computer (PC), a server, a workstation, a laptop computer, or a notebook computer.

In FIG. 1, processor 105 communicates over system bus 110 with input devices 115, display 120, communication interface 125, and memory 130. Though FIG. 1 shows only a single processor, multiple processors or a multi-core processor may be present in some embodiments.

Input devices 115 include, for example, a keyboard, a mouse or other pointing device, or other devices that are used to input data or commands to computer 100 to control its operation.

In the illustrative embodiment shown in FIG. 1, communication interface 125 is a Network Interface Card (NIC) that implements a standard such as IEEE 802.3 (often referred to as "Ethernet") or IEEE 802.11 (a set of wireless standards). In general, communication interface 125 permits computer 100 to communicate with other computers via one or more networks (e.g., the Internet). In communicating with other computers via a network, computer 100 may employ protocols such as the Internet protocol suite (TCP/IP), Hypertext Transfer Protocol (HTTP), Post Office Protocol (POP3), Internet Message Access Protocol (IMAP4), Simple Mail Transfer Protocol (SMTP), File Transfer Protocol (FTP), or other protocols.

Memory 130 may include, without limitation, random access memory (RAM), read-only memory (ROM), flash memory, magnetic storage (e.g., a hard disk drive), optical storage, or a combination of these, depending on the particular embodiment.

Application 135 may be divided into various functional modules or instruction segments (not shown in FIG. 1) that gather, analyze, and present, to an authorized entity on an aggregated and non-personally-identifiable basis, correlated data associated with the use of prepaid debit cards by one or more cardholders. In one illustrative embodiment, application 135 is implemented as a plurality of software program instructions executable by processor 105. Prior to being loaded into RAM for execution, the plurality of software program instructions may reside on a computer-readable storage medium such as, without limitation, a hard disk drive (HDD), a floppy diskette, an optical disc, or a flash memory. The functionality of application 135 will be described in greater detail below in connection with various illustrative embodiments of the invention. In general, the functionality of application 135 may be implemented in software, firmware, hardware, or any combination or sub-combination thereof.

Figure 2:
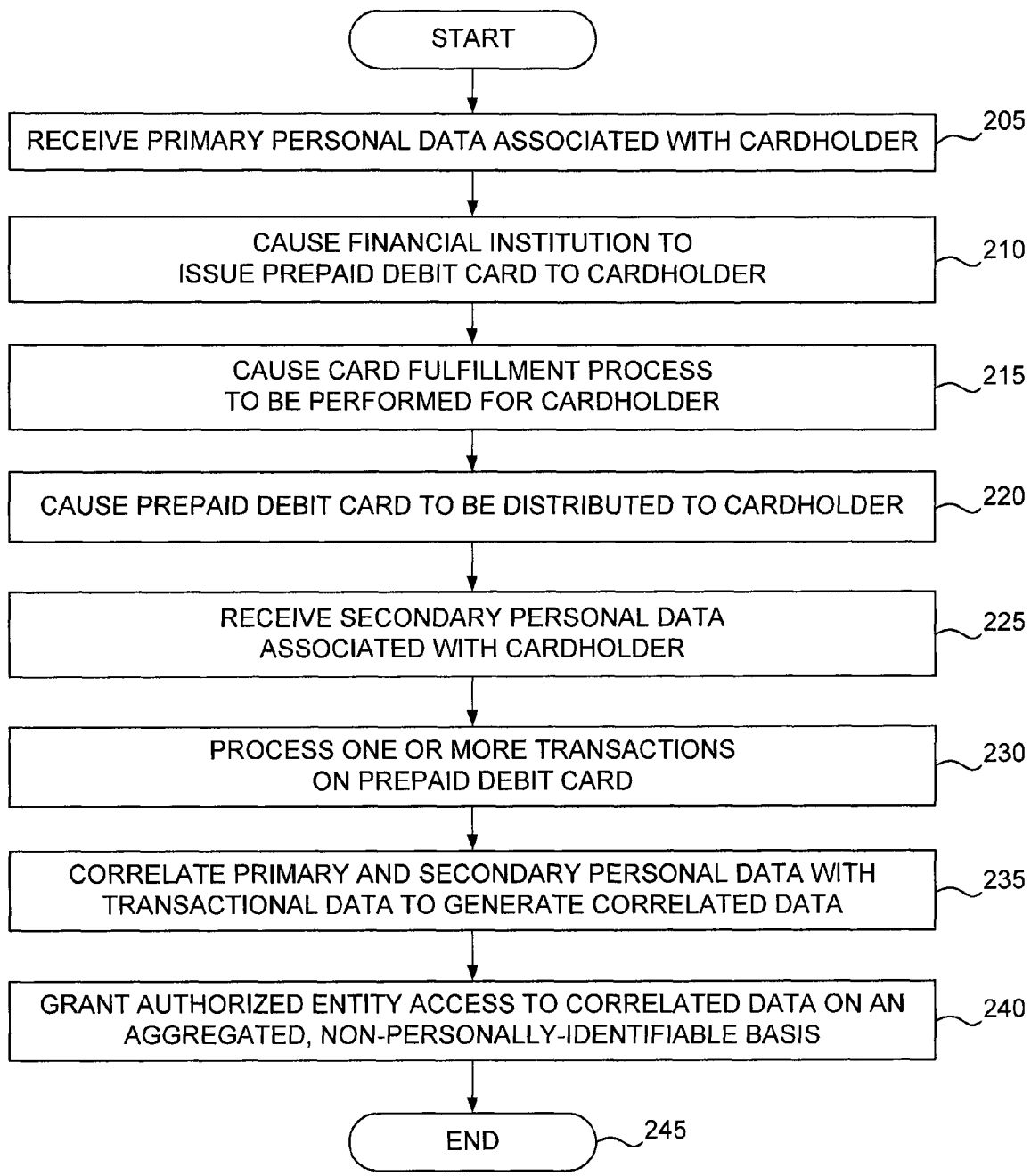
FIG. 2 is a flowchart of a method for gathering and reporting data associated with a cardholder's use of a prepaid debit card, in accordance with an illustrative embodiment of the invention.

FIG. 2 is a flowchart of a method for gathering and reporting data associated with a cardholder's use of a prepaid debit card, in accordance with an illustrative embodiment of the invention. At 205, application 135 receives primary personal data associated with a cardholder in connection with the issuance to the cardholder of a prepaid debit card. Such primary personal data generally includes at least the cardholder's name and address. In some embodiments, depending on the particular type of prepaid debit card to be issued to the cardholder, the primary personal data may also include the cardholder's social security number and date of birth for purposes of regulatory compliance. In some embodiments, the primary personal data is derived from the cardholder's response to a business reply card or an on-line questionnaire or survey prior to issuance of the prepaid debit card.

At 210, an entity referred to herein as a "data processor" practicing the method shown in FIG. 2 causes a financial institution (e.g., a bank) to issue a prepaid debit card to the cardholder. The prepaid debit card may be branded as, for example, MASTERCARD, VISA, AMERICAN EXPRESS, DISCOVER, or some other brand, depending on the particular affiliations of the financial institution. At 215, the data processor causes a card fulfillment process to be performed for the cardholder. At 220, the data processor causes the prepaid debit card to be distributed to the cardholder. Initially, the prepaid debit card is loaded with a predetermined monetary value (e.g., $100) in accordance with the applicable prepaid-debit-card program.

At 225, application 135 receives secondary personal data associated with the cardholder. Secondary personal data may include information such as the cardholder's gender, household income range, age range, marital status, or other pertinent data that would be of interest to a program sponsor or to an unaffiliated third party with which the cardholder has not yet established a commercial relationship using the prepaid debit card. In some illustrative embodiments, the secondary personal data is derived from the cardholder's response to a survey. For example, the cardholder may be directed, on the packaging that accompanies the prepaid debit card, to visit a particular site on the World Wide Web ("Web") to complete an on-line survey. In some embodiments, the survey is administered in another way (e.g., by mail). In the context of incentive cards (to be discussed in greater detail below in connection with FIG. 7), this survey may be connected with a loyalty program of the program sponsor. In the embodiment shown in FIG. 2, the secondary personal data can be received at a time other than that implied by the order in which Block 225 appears in FIG. 2 relative to the other blocks. In that respect, the chronology indicated in FIG. 2 is merely illustrative.

At 230, the data processor processes one or more transactions initiated by the cardholder with the prepaid debit card. For example, the cardholder may use the prepaid debit card to purchase goods, services, or both.

At 235, application 135 correlates the primary and secondary personal data with transactional data associated with the one or more transactions processed at 230 to generate what is herein referred to as "correlated data." That is, application 135 associates the primary and secondary personal data associated with the cardholder with the cardholder's usage of the prepaid debit card, as reflected in the transactional data.

At 240, the data processor grants an authorized entity access (e.g., via computer 100 and application 135) to at least a portion of the correlated data on an aggregated and non-personally-identifiable basis. The data is provided in this manner to protect the privacy of individual cardholders. The content of this aggregated and non-personally-identifiable correlated data and the format in which it may be presented are discussed in further detail below.

Depending on the particular embodiment, the "authorized entity" may be any of a variety of program sponsors or unaffiliated third parties. In the context of incentive cards, for example, an authorized entity may be a promotional entity such as a promotional company running a promotional campaign on behalf of a promotional client or a promotional client such as a manufacturer or vendor running its own promotional campaign. In the context of general-purpose reloadable cards, an authorized entity may be, for example, a program manager. In the payroll-card context, an authorized entity may be, for example, the cardholder's employer or an agent thereof. Herein, an "authorized entity" is an entity with which the data processor has contracted to provide the above-described aggregated and non-personally-identifiable correlated data. In an illustrative embodiment, the data processor sells this service to the authorized entity as part of a for-profit business venture.

At 245, the process terminates.

Figure 3:
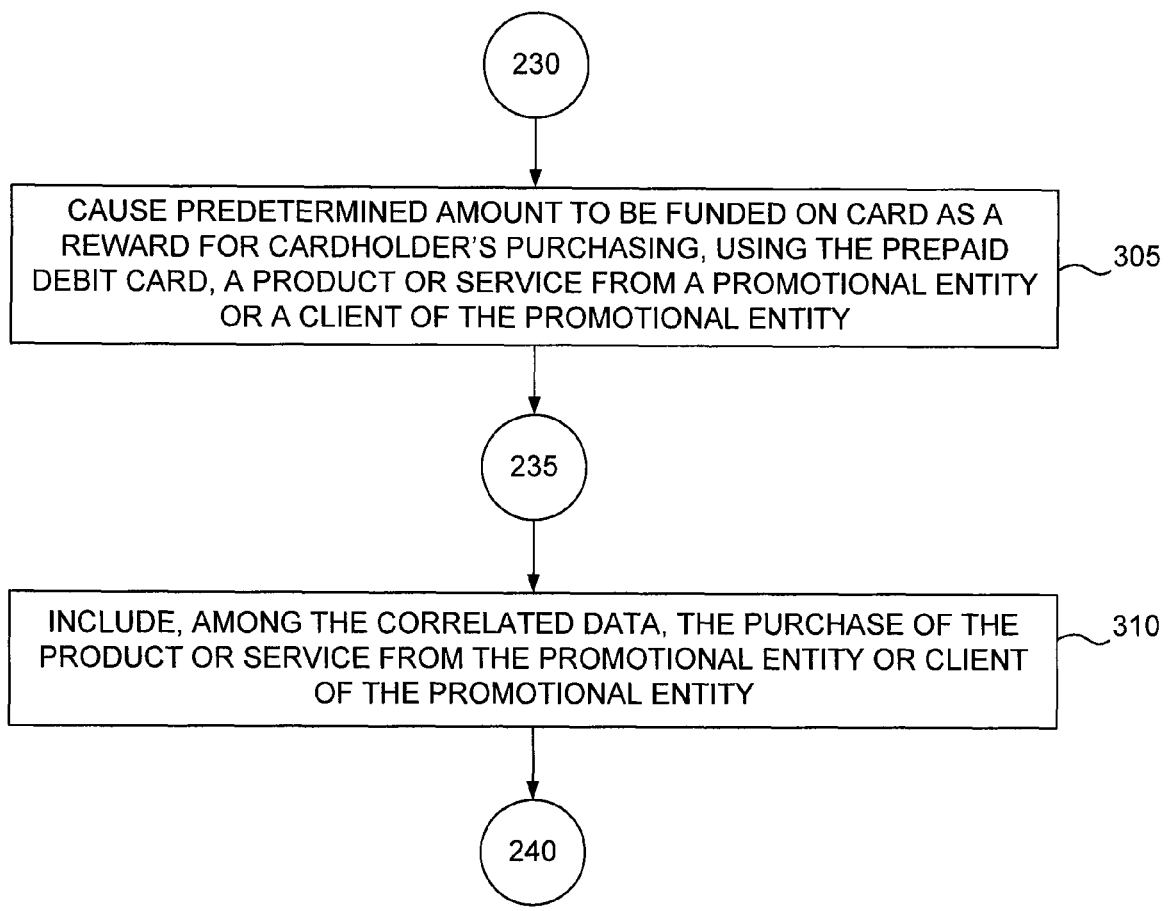
FIG. 3 is a flowchart of a method for gathering and reporting data associated with a cardholder's use of a prepaid debit card, in accordance with another illustrative embodiment of the invention.

FIG. 3 is a flowchart of a method for gathering and reporting data associated with a cardholder's use of a prepaid debit card, in accordance with another illustrative embodiment of the invention. In the method shown in FIG. 3, the prepaid debit card is assumed to have been offered to the cardholder by a promotional entity as an economic incentive. The prepaid debit card may thus, in this context, be termed an "incentive card." For example, the promotional entity may be a vendor or merchant (e.g., WALMART), and the economic incentive may be a coupon offered to the cardholder by the vendor or merchant. In other embodiments, the prepaid debit card may be associated with a loyalty program sponsored by a manufacturer or merchant. As noted above, the promotional entity may, in some embodiments, be a promotional company that conducts an economic incentive campaign on behalf of a client of the promotional company.

The method shown in FIG. 3 proceeds as in FIG. 2 through Block 230. At 305, the data processor causes a predetermined amount of money to be funded on the prepaid debit card (incentive card) as a reward for the cardholder's purchasing, using the prepaid debit card, a product or service from the promotional entity or a client of the promotional entity, depending on the particular embodiment.

Once the primary and personal data have been correlated with the applicable transactional data at 235, the method proceeds to Block 310. At 310, the purchase by the cardholder of the product or service from the promotional entity or a client thereof is included among the correlated data to which the authorized entity is, at 240, granted access on an aggregated and non-personally-identifiable basis. This permits the authorized entity (in this case the promotional entity) to determine, among other things, whether issuance to the cardholder of the incentive card has succeeded in fostering loyalty toward the promotional entity or a client thereof in the form of additional purchases from the same manufacturer, service provider, or vendor. Funding the card in response to such secondary purchases rewards the cardholder for that loyalty.

Figure 4:
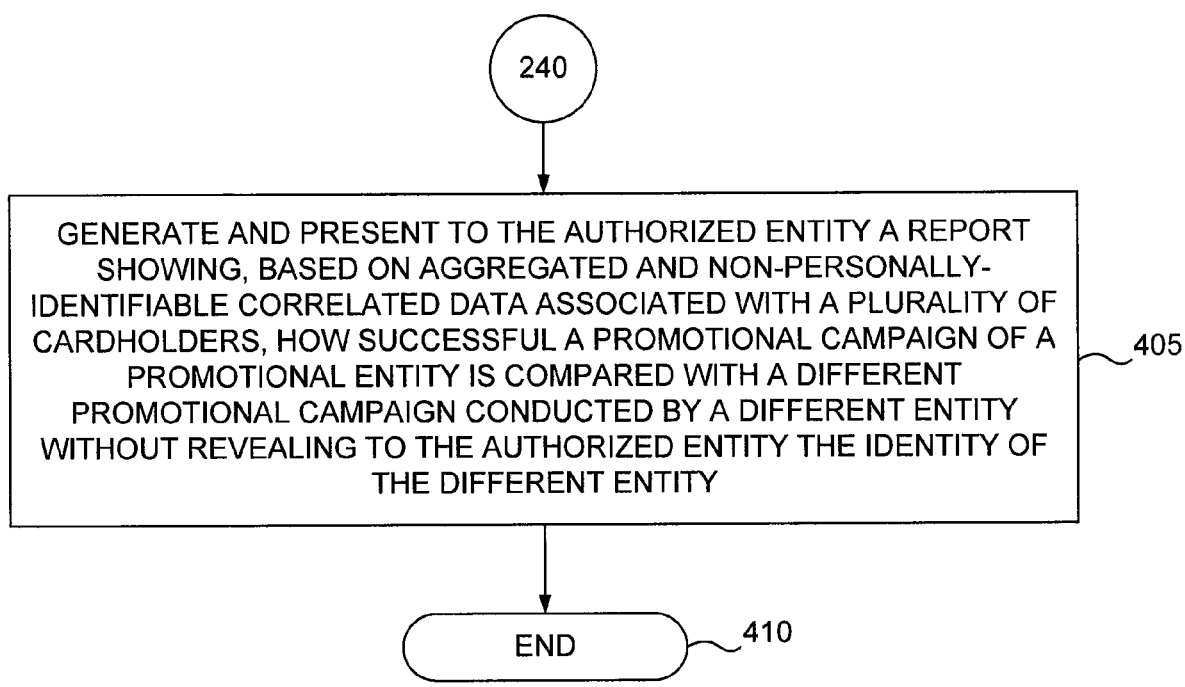
FIG. 4 is a flowchart of a method for gathering and reporting data associated with a cardholder's use of a prepaid debit card, in accordance with another illustrative embodiment of the invention.

FIG. 4 is a flowchart of a method for gathering and reporting data associated with a cardholder's use of a prepaid debit card, in accordance with another illustrative embodiment of the invention. Like FIG. 3, the method shown in FIG. 4 is also carried out in the incentive-card context.

The method shown in FIG. 4 proceeds as in FIG. 2 through Block 240. At 405, application 135 generates and presents to the authorized entity a report showing, based on aggregated and non-personally-identifiable correlated data associated with a plurality of cardholders, how successful a promotional campaign of the promotional entity is compared with a different promotional campaign conducted by a different entity without revealing to the authorized entity the identity of the different entity. This reporting capability is discussed in further detail below in connection with FIG. 7. At 410, the process terminates.

The issuance to the cardholder of a prepaid debit card provides opportunities for a variety of related marketing initiatives. One example of such a related marketing initiative is provided in FIG. 5, which is a flowchart of a method for gathering and reporting data associated with a cardholder's use of a prepaid debit card, in accordance with another illustrative embodiment of the invention.

Figure 5:
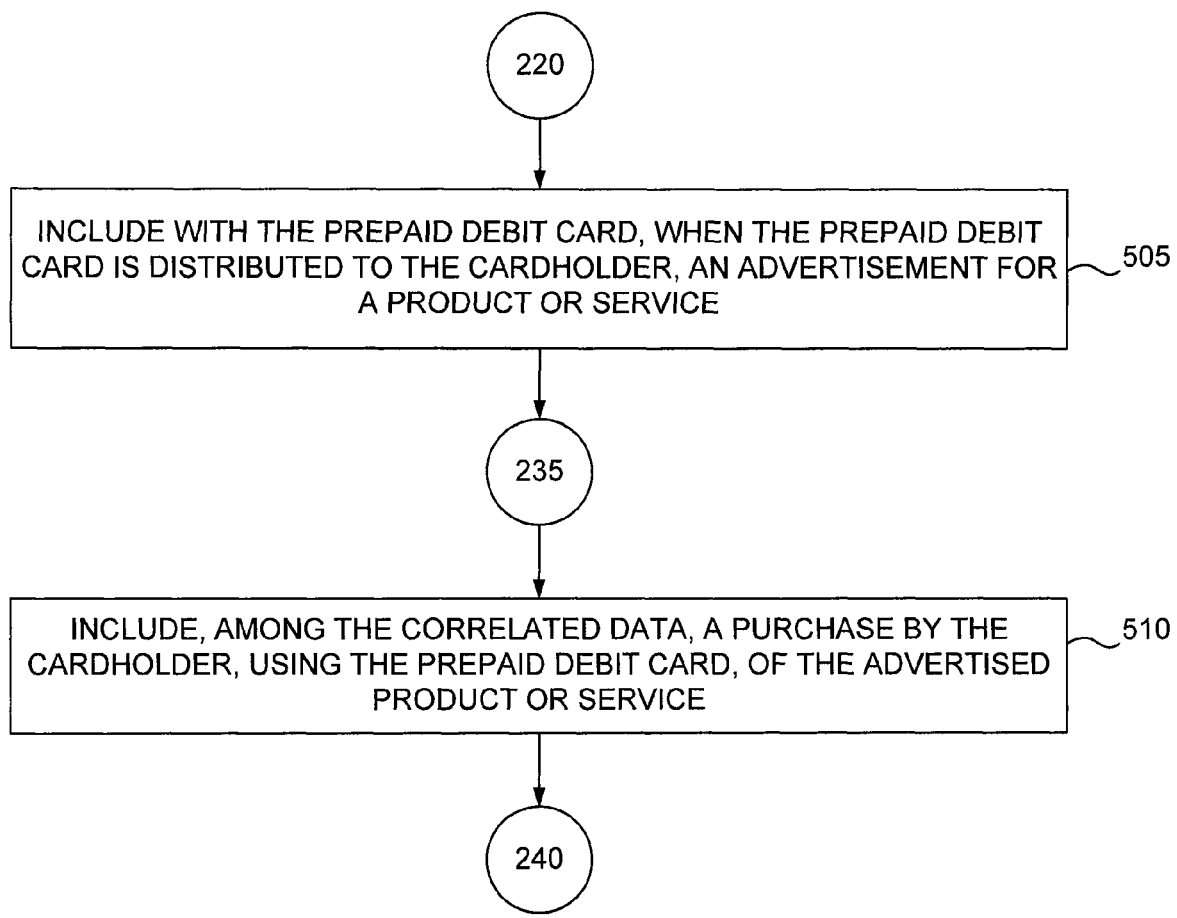
FIG. 5 is a flowchart of a method for gathering and reporting data associated with a cardholder's use of a prepaid debit card, in accordance with another illustrative embodiment of the invention.

The method shown in FIG. 5 proceeds as in FIG. 2 through Block 220. At 505, the data processor includes with the prepaid debit card, when the prepaid debit card is distributed to the cardholder, an advertisement for a product or service. For example, such an advertisement may be placed on the carrier or packaging that accompanies the prepaid debit card when it is mailed to the cardholder. The advertiser may be the program sponsor associated with the prepaid debit card or an arbitrary unaffiliated third party. In general, the advertiser is any entity that has paid or otherwise arranged for the advertising space. In some embodiments, the data processor (e.g., the card processor) sells this service to the advertiser. In other embodiments, the advertiser may instead arrange for placement of the advertisement directly with the issuing financial institution.

Once the primary and secondary personal data have been correlated with the applicable transactional data at 235, the method proceeds to Block 510. At 510, a subsequent purchase by the cardholder, using the prepaid debit card, of the advertised product or service is included among the correlated data to which the authorized entity (e.g., the advertiser), at 240, is granted access on an aggregated and non-personally-identifiable basis. Such information is valuable to the advertiser in planning future marketing initiatives.

Figure 6A:
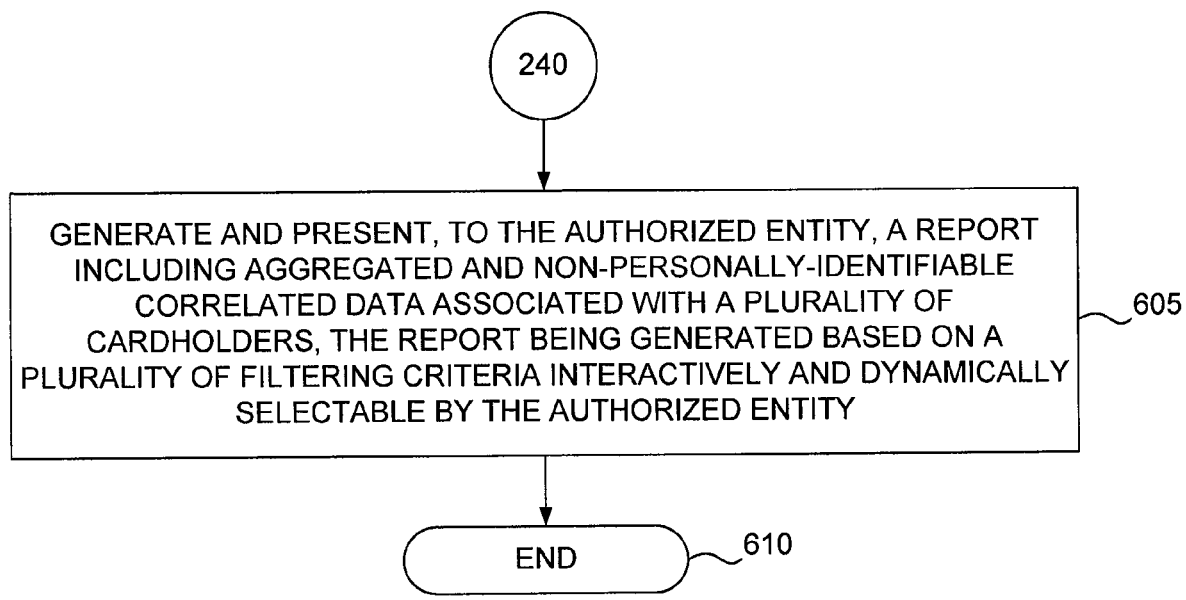
FIG. 6A is a flowchart of a method for gathering and reporting data associated with a cardholder's use of a prepaid debit card, in accordance with another illustrative embodiment of the invention.

FIG. 6A is a flowchart of a method for gathering and reporting data associated with a cardholder's use of a prepaid debit card, in accordance with another illustrative embodiment of the invention. The method shown in FIG. 6A proceeds as in FIG. 2 through Block 240. At 605, application 135 generates and presents, to the authorized entity, a report including aggregated and non-personally-identifiable correlated data associated with a plurality of cardholders.

In this embodiment, the report is generated based on a plurality of filtering criteria that are interactively and dynamically selectable by the authorized entity. In one illustrative embodiment, the filtering criteria include one or more of geographic region, age, gender, marital status, time period, and product or service category. The user may select the filtering criteria using user-interface control elements such as dropdown lists, radio buttons, virtual pushbuttons, icons, or other control elements that are well known to those in the computer-programming art. More specific examples of such reports are discussed below in connection with FIG. 7. The process terminates at 610.

Reports may be conveyed to the authorized entity by any suitable means, including, without limitation, a Web site hosted by computer 100 at which the authorized entity logs on to access application 135, an e-mail message, or a secure FTP site.

Figure 6B:
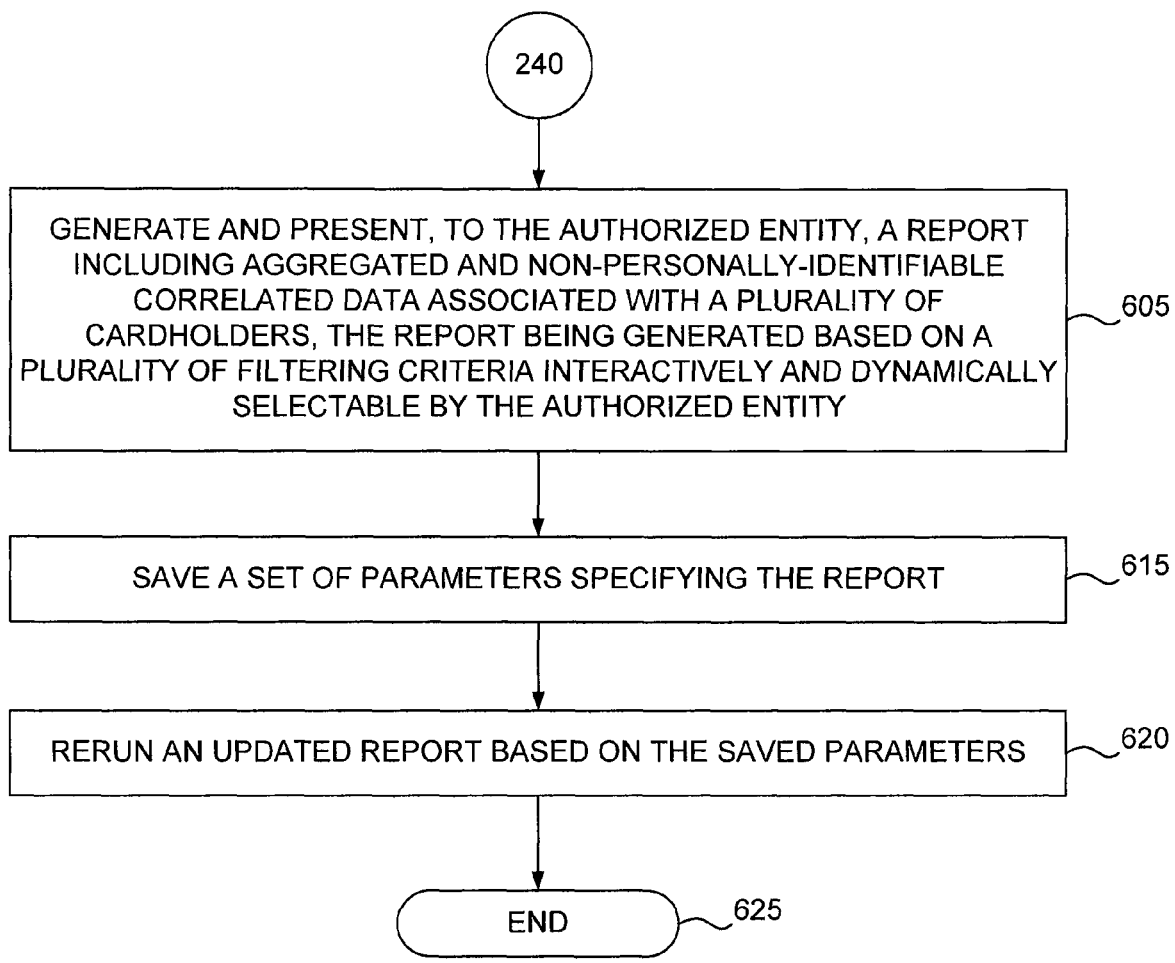
FIG. 6B is a flowchart of a method for gathering and reporting data associated with a cardholder's use of a prepaid debit card, in accordance with yet another illustrative embodiment of the invention.

FIG. 6B is a flowchart of a method for gathering and reporting data associated with a cardholder's use of a prepaid debit card, in accordance with yet another illustrative embodiment of the invention. The method shown in FIG. 6B proceeds as in FIGS. 2 and 6A through Block 605. At 615, application 135 saves, at the request of the authorized entity, a set of parameters specifying the report generated and presented at 605.

At 620, application 135, in response to a request from the authorized entity at a later time, reruns the report generated at 605 based on the saved set of parameters. In rerunning the report, application 135 automatically updates the report to reflect the latest aggregated and non-personally-identifiable correlated data associated with a plurality of cardholders. At 625, the process terminates.

As mentioned above, the principles of the invention can be applied to general-purpose reloadable cards. A general-purpose reloadable card is a well-known type of prepaid debit card that is branded with a network logo such as MASTERCARD, VISA, AMERICAN EXPRESS, OR DISCOVER; is reloadable with monetary value; and is functionally interchangeable with traditional debit cards for a wide variety of on-line and off-line uses in commerce, often including Automated Teller Machine (ATM) access. In some cases, the general-purpose reloadable card can be reloaded with monetary value by the cardholder at various reload locations such as MoneyGram and Western Union agent locations. An entity that markets general-purpose-reloadable-card programs is often referred to in the industry as a "program manager."

General-purpose reloadable cards are particularly attractive because they provide a number of important bank-like services outside the traditional bank-account relationship. General-purpose reloadable cards help eliminate the need for multiple cards for various types of payments/loads associated with specialized programs.

Besides the advantages of managing only a single card per participant, being able to fund the cards within a matter of hours (more cost effective than issuing new cards for every disbursement), and fostering program brand recognition and awareness by participating cardholders of where the funds came from, an illustrative embodiment of the invention enables program managers, via application 135, to generate reports such as those described above in connection with FIGS. 6A and 6B. This permits the program manager to, among other things, better target future opportunities to reward participants through additional programs and "spiffs."

Besides the advantages of convenience and immediate availability of funds/loads from the program manager, the cardholder also benefits from the additional opportunities to earn funds/loads through offers made by the program manager based on the data to which the program manager is granted access through various embodiments of the invention.

In some cases, a general-purpose reloadable card may be configured as a payroll card. Such a payroll card serves as a replacement for the traditional check or direct-deposit method of payroll practiced by most companies. The payroll card permits the employer to pay the employee directly without the need for the employee to have a bank account. Various payroll items such as standard compensation, bonuses, incentives, and rewards payments can all be tracked via a payroll reporting system.

Payroll cards provide a number of benefits to the employer, including (1) elimination of many "check" payouts, (2) elimination of the need to interface with multiple banks for direct deposit, (3) specialized reporting to allow for the breakdown of various types of payroll disbursements, (4) the ability to disburse funds to employees on an "as-needed" basis, and (5) saving money by avoiding the overhead expenses associated with paper checks or direct deposits through a payroll company such as ADP.

Additionally, an illustrative embodiment of the invention permits an employer to view reports that include aggregated and non-personally-identifiable correlated data associated with its employees. Such reports may be similar to those discussed above in connection with FIGS. 6A and 6B. The employer can then offer additional employee programs such as discounts at certain merchants via negotiated deals based on the trends identified within the correlated data. In some embodiments, the employer is permitted to view reports containing individualized employee data.

The employee also benefits from a payroll card in several ways, including (1) the immediate availability of funds without the need for a bank account, (2) the enjoyment of additional discounts offered by the employer based on the kind of analysis that an illustrative embodiment of the invention (e.g., application 135) makes possible, (3) the viewing of detailed reports that show all types of payroll disbursements received, (4) the ability to participate in integrated bill payment programs directly from the payroll card, and (5) the ability to transfer money to any other financial institution through the institution issuing the payroll card.

As discussed above, in some embodiments, the authorized entity may be an unaffiliated third party with which the cardholder has not yet established a commercial relationship through the use of a particular prepaid debit card. Such an unaffiliated third party may be, for example, an advertiser not directly involved in the transaction flow that nevertheless desires to advertise a product on the carrier or product packaging that accompanies a prepaid debit card when it is distributed to the cardholder, as discussed above. Another example of an unaffiliated third party is a merchant or manufacturer that is considering launching a prepaid-debit-card-based coupon, rebate, or other incentive program. Such an entity may desire to view aggregated data associated with promotional campaigns conducted by other entities to determine how best to proceed with its own campaign. Such exploration is made possible by, e.g., application 135 described above.

Such an unaffiliated third party may also benefit in a number of ways from an illustrative embodiment of the invention such as those described above in connection with FIGS. 1-6B. For example, merchants can participate in additional offers that will drive higher spending by the participants within their respective stores. Programs can also span multiple brands/merchants to offer even larger rewards to the participant for spending appropriately, allowing merchants to collaborate to gain even higher yield and loyalty from the participant. The targeted advertising and offers facilitated by various embodiments of the invention can also help to build loyalty on the part of cardholders.

The end-to-end process flow of an illustrative embodiment of the invention will next be described in greater detail in the incentive-card context. Though this description focuses on incentive cards, many of the principles discussed in connection with this illustrative embodiment can be adapted and applied in other contexts such as general-purpose reloadable cards and payroll cards.

Figure 7:
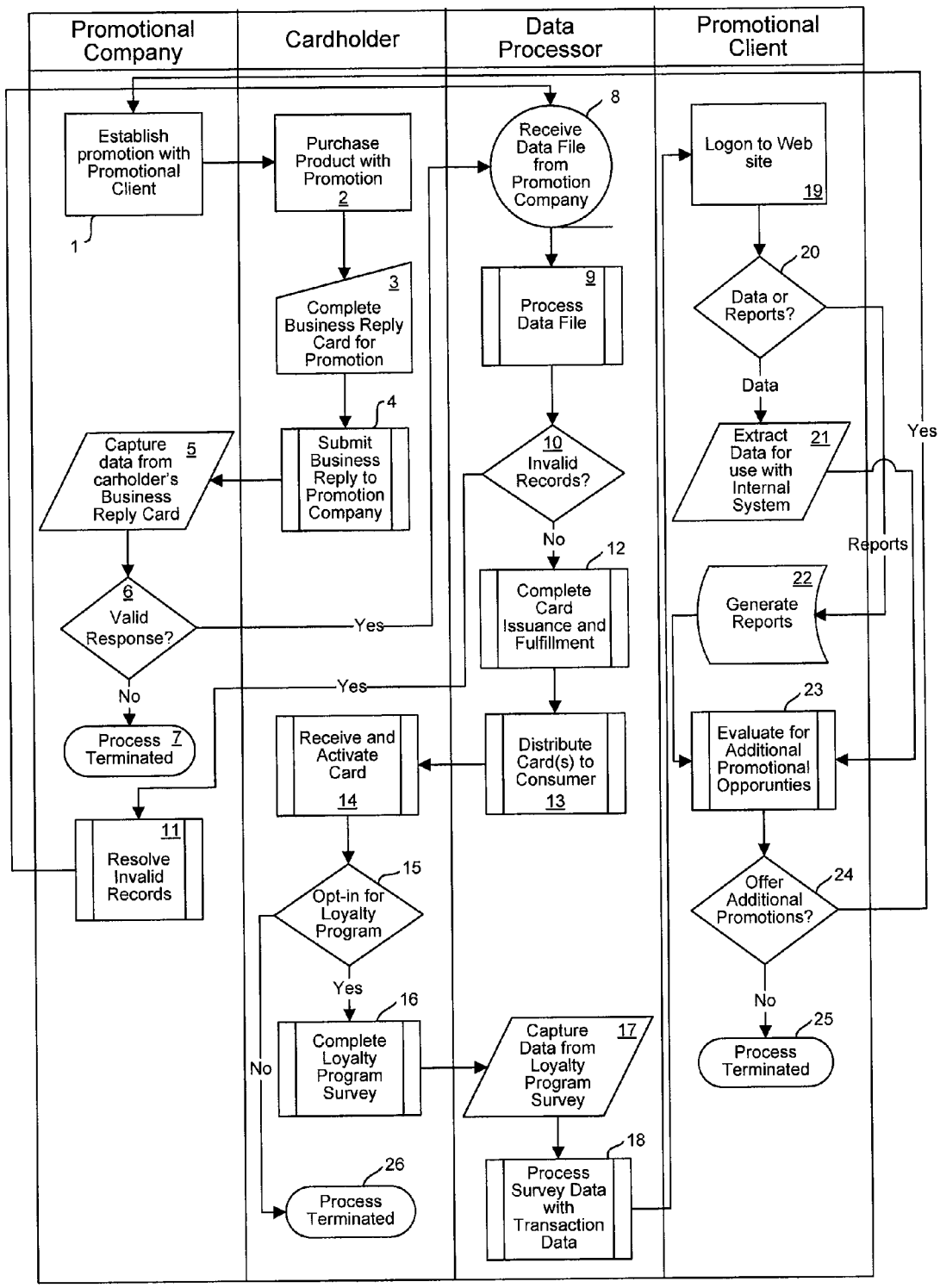
FIG. 7 is a process flow diagram of a method for gathering and reporting data associated with a cardholder's use of a prepaid debit card offered to the cardholder as an economic incentive, in accordance with an illustrative embodiment of the invention.

FIG. 7 is a process flow diagram of a method for gathering and reporting data associated with a cardholder's use of a prepaid debit card offered to the cardholder as an economic incentive, in accordance with an illustrative embodiment of the invention. At Block 1, a promotional company (leftmost column of FIG. 7) establishes a business relationship with a promotional client (rightmost column of FIG. 7). Note that such a promotional company may not be in involved in every embodiment, as noted above. In some embodiments, a manufacturer or vendor is the program sponsor rather than a promotional company serving a promotional client.

In the particular embodiment depicted in FIG. 7, the promotional company is assumed to have a client (e.g., a manufacturer or a merchant) on whose behalf the promotional company is running a promotional campaign. In this particular embodiment, the promotional company and/or its client is the authorized entity to which the data processor (e.g., card processor—see second column from the right in FIG. 7) grants access to correlated data on an aggregated and non-personally-identifiable basis. In this embodiment, the data processor grants the program sponsor, as a value-added service, access to aggregated and non-personally-identifiable correlated data associated with a plurality of cardholders.

At 2, the future cardholder (e.g., a consumer) purchases a product with which a promotion or other economic incentive (e.g., a manufacturer's rebate or a vendor's coupon) is associated. For example, the program sponsor may be a manufacturer, and the economic incentive may be a rebate offered by the manufacturer in connection with the cardholder's purchase of a particular product produced by the manufacturer. At 3, the consumer completes a business reply card. The purpose of the business reply card is to fulfill the promotion initially—to get the prepaid debit card (incentive card) into the cardholder's possession. Such a business reply card could go directly from the consumer to the data processor, or it could go first to the promotional company, depending on the particular embodiment.

In the particular embodiment shown in FIG. 7, the consumer, at 4, submits the business reply card to the promotional company, where the information contained on it is received and validated. For example, there are certain regulatory and compliance requirements that may need to be satisfied.

At 5 and 6, the relevant data is captured from the business reply card and is verified to determine whether the response from the consumer is valid. If not, the process can be terminated at 7. In such a case, the promotional company may be able to clean up the faulty information and resubmit it. One issue of primary concern is whether the consumer's address is complete. If so, and if required for the particular type of incentive card to be issued, the name-address pair is checked in compliance with requirements of the Office of Foreign Assets Control (OFAC). In some cases, additional information such as the consumer's Social Security number and date of birth may be required for compliance purposes.

At 8, the promotional company sends a data file containing the data gleaned from the business reply card to the data processor. At this point in the process, the data processor receives into its system the necessary data about the consumer to generate the prepaid debit card. The data processor uses this data to arrange for the issuance to the cardholder, by a financial institution, of a MASTERCARD number or a VISA number, for example. Other possible brands include, without limitation, AMERICAN EXPRESS and DISCOVER.

At 9, the data processor processes the data received at 8. This processing can include another check to make sure that no invalid records have come through the processing side. In particular, the data processor checks to make sure there are no issues with the consumer's mailing address (the address to which the incentive card will ultimately be mailed).

If there are invalid records at 10, the process proceeds to 11, where the promotional company is informed that the data processor cannot ship to the invalid address. If the promotional company is able to resolve the difficulty at 11, the corrected data can be resubmitted to the data processor at 8 (in a circular, iterative fashion, if needed).

If there are no invalid records at 10, the data processor causes card issuance and fulfillment processes to be completed for the consumer at 12. Among the information that is supplied to the cardholder with the card is activation instructions for the card. Those activation instructions will give the card recipient a Uniform Resource Locator (URL) on the Web that he or she needs to visit to activate the card. This URL is, in some embodiments, customized for individual customers of the data processor.

Once the card and associated carriers and packaging are complete, the data processor causes the card to be distributed to the consumer at 13.

At 14, the consumer receives the card and activates it by visiting the Web site mentioned above. Once the cardholder has clicked on "I Agree," indicating his or her agreement with the terms of the promotional campaign, he or she is presented with an on-line survey. Note that, in other embodiments, the survey may be administered in some way other than on-line. For example, the survey can be administered by mail or some other means. In this embodiment, the data processor's system presents questions that the particular program sponsor has designed, including product specific questions.

An example will help illustrate how this works. For this example, consider a fictitious company, "XYZ Company." XYZ Company is selling a telephone product and plans to offer a $50 gift card as its economic incentive (promotion). As a part of the consumer's setting up of that telephone, XYZ Company collects answers to demographic questions—age, gender, living quarters, marital status, income, etc. Many of the questions are not simple yes/no questions. Though gender is pretty simple, age has brackets; income has brackets; marital status has different categories such as "divorced," "widowed," and "married," for example.

In some embodiments, the data processor provides to its customer (in the embodiment of FIG. 7, the promotional company) a default set of on-line survey questions that the promotional company, as program sponsor, can modify to suit its particular needs. For example, if the default age ranges provided by the data processor are 18 to 25, 26 to 34, 35 to 42, 43 to 50, and 50 and up, the promotional company might decide on different ranges, such as 18 to 21, 22 to 25, 26 to 29, 30 to 34, and 35 and up. The promotional company is permitted to change completely the answer set for that question. The promotional company can carry out the same kind of customization for the remaining demographical questions. Before the on-line survey is presented to a consumer (future cardholder), it can be shown to the data processor's customer (here, the promotional company) in advance so the customer can see exactly what the participating consumer's on-line experience will be like.

In some embodiments, the on-line survey also includes product-specific questions. For example, one question might ask the cardholder which model phone the cardholder bought from XYZ Company. Another question might ask the cardholder how many phones the cardholder bought, and additional questions might ask the cardholder how many total phones he or she owns and how many of those are the XYZ brand. The possible responses to such product-specific questions can be presented as, for example, true/false, yes/no, or a range.

The data processor collects the answers to these various survey questions and stores them in a database in memory 130 that is accessible to application 135.

In some embodiments, the data processor also determines whether the consumer is a returning customer. If so, the consumer can provide an e-mail address and a password. If not, the consumer provides an e-mail address and a password to enter the setup screen.

For returning customers, the data processor's information processing system (e.g., computer 100), in the setup mode, displays the consumer's name, address, and all other relevant information the data processor has on that consumer. If necessary, the consumer's address is updated. Particularly important are the consumer's state, Zip Code, and phone number. Such information, along with other information obtained from the on-line survey at activation, can be used as filtering criteria for the generation of reports (see FIGS. 6A and 6B and the corresponding discussion above). Such reports can include some interesting views and, in some embodiments, graphs. For example, the promotional company might discover that there are people fulfilling from all over and that there are unique patterns from Texas to California.

Once the consumer has completed all of the necessary steps at 14, 15, and 16, the consumer (cardholder) now has an active card. In the illustrative embodiment shown in FIG. 7, a choice by the consumer not to participate in the promotion at 16 results in the process being terminated at 26.

In some embodiments, the process shown in FIG. 7 includes a loyalty aspect, as indicated above (see Blocks 15 and 16 in FIG. 7). That is, the cardholder can earn something extra by purchasing additional products or services from a designated entity (e.g., a manufacturer or merchant, which may, in some embodiments, be the client of the promotional company). For example, the cardholder, in one embodiment, can receive a reward in the form of additional monetary value being funded to the prepaid debit card if the cardholder buys additional products or services from the designated entity (see also FIG. 3 and the corresponding description above). Thus, the primary information of interest to the promotional company and its client that can be provided via application 135 is how many people took their rebate card and, through a transactional process, used their card to purchase something else that yielded another rebate or how many simply used the card to purchase something else from the applicable manufacturer or merchant, even though there was no additional rebate involved.

One goal of such a loyalty program is to promote larger rebates. But, in order to get the larger rebate, the cardholder needs to be a repeat customer, as described above. To track loyalty purchases, the data processor wants to know that the cardholder has opted in for the loyalty program. At 15 and 16, the cardholder opts in for the loyalty program and completes the loyalty survey. At 17, the data processor captures the loyalty-program data from the survey and can correlate other data (e.g., transactional data) with it (Block 18), as described above.

Consider an example in which a particular company not only sells a telephone but also sells a radio. The data processor can provide an analysis of like promotions across that company by dollar value and by product type. In some embodiments, the data processor permits one customer (e.g., Program Sponsor A) to examine data indicating how successful Program Sponsor A's promotional campaign has been relative to that of a different entity (e.g., Program Sponsor B) without revealing to Program Sponsor A the identity of Program Sponsor B. For example, application 135 could reveal to Program Sponsor A that its success rate in the 25-35 demographic is 15% and that Program Sponsor B's was 60% (without naming Program Sponsor B by name). In this example, Program Sponsor A would know that it likely did something wrong in marketing its product because it did not receive a favorable response compared with Program Sponsor B.

Regarding the cardholder's phone number, the data processor can key off of the prefixes within a given area code in some embodiments. For example, the data processor can use the prefixes to provide a report to the program sponsor that permits the program sponsor to determine whether it is hitting one area better than another in a city that has, say, six prefixes.

Another important aspect of the illustrative embodiment shown in FIG. 7 is transactional data. In the reports containing correlated personal and transactional data that the data processor provides to the program sponsor, the program sponsor cannot see the specific cardholder's data. What the program sponsor does see is aggregated and non-personally-identifiable correlated data. For example, the program sponsor will see that it has 400 cardholders who bought Product X. But it will not, in this embodiment, be able to drill down and actually see that a specific cardholder bought something from Best Buy.

The data processor collects the correlated data over time, making it possible to observe some pattern behaviors. Take, for example, the age ranges 18 to 21 and 22 to 25. In this example, assume that the first range made up 40% of the responses; the second, 28%. The 18 to 21 age range could be broken down into single versus married, or this age range could instead be broken down by income bracket. This permits the program sponsor, via application 135, to select one subcategory and look at how many phones from Brand X, for example, consumers in a particular subcategory have. This is similar to a decision tree, and the program sponsor to which the data processor grants access to the aggregated and non-personally-identifiable correlated data can mine its way down to determine that, for example, 18 to 21 singles making $30,000 per year have only three out of five products sold by Brand X. The program sponsor can also determine, via application 135, within what period a particular value on a card (e.g., $60) was spent.

In the illustrative embodiment of FIG. 7, the data processor can also facilitate targeted marketing. For example, if the program sponsor can determine, via application 135, the spending patterns of a particular cardholder and where he or she shops, and if the program sponsor thinks a product the program sponsor offers would be of interest to that cardholder, the data processor or issuing financial institution can include an advertisement for that product on the carrier or other packaging that is distributed with the card. If the cardholder subsequently purchases the advertised product, the data processor can include that purchase among the correlated data to which the program sponsor is granted access on an aggregated and non-personally-identifiable basis. This permits the program sponsor to gauge the effectiveness of its loyalty program.

Consider another example in which a program sponsor is running a six-month promotional campaign targeted at the 18 to 25 age segment, and the numbers are inverse. That is, instead of 68% of the overall traffic being from cardholders aged 18 to 21 as desired, it is only 20%. In such a case, the program sponsor could choose to make immediate program changes because, based on the reports generated by application 135 and made available by the data processor, the program sponsor now has considerable visibility midstream of the promotion on a real-time basis.

Finally, consider Blocks 19-25 in FIG. 7. At this point, the promotional client (in this embodiment, at least one of the authorized entities) logs in to computer 100 to provide data to the data processor (see, e.g., Block 8) or to obtain reports from the data processor via application 135 (Blocks 19, 20, and 22). If it is logging in to obtain reports, the promotional client can do so on the fly, in some embodiments, via application 135. Further, in some embodiments, application 135 permits the promotional client or other authorized entity (e.g., the promotional company) to export data to another application (Block 21). This can be done, for example, by generating a flat file that is made available to the promotional client via a secure FTP server over a network. Alternatively, reports and other data can be securely e-mailed from computer 100 to the promotional client.

In this embodiment, the data processor treats the correlated data—even in an aggregated form—as highly sensitive, and the data processor takes steps to protect the data until it leaves its domain.

On the screen of a client computer system in communication with computer 100, the reports are highly interactive. The user can choose to, for example, look at two particular age segments (e.g., 18 to 21 and 22 to 25). Very quickly and without regenerating the report, the user can click the age dropdown list, click the "x" next to the additional age range, and the report is immediately updated accordingly.

The reports output by application 135 can include graphics, including graphs such as bar graphs, pie graphs, scatter grams, or other visual representations of the data. In some embodiments, the graphs are similar to what one might find in an application like MICROSOFT EXCEL. The user can choose to move things back and forth between the "x" and "y" axes, so the user might, for example, have age on the top and income on the left, and the user can decide to put income at the top and gender on the left, simultaneously filtering the data with an age range of 18 to 21 and an income level of "less than $30,000." Next, the user can look at the male/female slice, and all of this is interactive, in this illustrative embodiment. That is, the authorized entity does not have to start over and run a different report as each change is made in the filtering criteria.

Once the promotional client finds a particular report configuration that meets its needs, application 135 offers the option to save a set of parameters defining that particular report view by name so that when the promotional client logs in a week later, for example, it can recall the same report again with updated, current correlated data.

In one illustrative embodiment, application 135 can generate a report that compares correlated data associated with a first time slice with correlated data associated with a second time slice from a later period. For example, Weeks 1 through 4 could be designated Slice 1, and weeks 5 through 8 could be designated Slice 2. Application 135 can be configured to display a report showing the change from Slice 1 to Slice 2, for example.

There is a hierarchy within a given promotional campaign because most promotional companies serve multiple clients. Consider the example of MAYTAG, which sells refrigerators, dishwashers, washers, dryers, stoves, and other appliances. One way to view such a hierarchy is, from top to bottom, promotional company (e.g., Marketing Innovators), MAYTAG (manufacturer and client of the promotional company), and products such as refrigerators, dishwashers, washers, dryers, stoves, and other appliances.

In the above example, the promotional company can look at all of the promotions that have been done in the kitchen space: refrigerators, stoves, dishwashers, disposals, etc., and aggregate all of that data together. The promotional company receives significant value from the service provided by data processor and application 135 because it can cut across its various promotions. For example, the promotional company might be looking to determine how many people bought refrigerators and dishwashers, which facilitates targeted marketing. For example, if only 40% of the cardholders actually bought a dishwasher, perhaps the vendor (e.g., MAYTAG) could place an ad on the next card packaging or carrier to target a dishwasher to the consumers it knows did not buy one.

In one embodiment, the data processor allows a vendor like MAYTAG itself to log onto computer 100 and access application 135 via its promotional company's account, subject to certain restrictions. For example, there might be power in letting MAYTAG's marketing team log in to see everything MAYTAG-related, but the promotional company might also have GE as a client, for example. Application 135, in such an embodiment, is configured to prevent MAYTAG users from seeing any GE data or data belonging to any other client of the promotional company. In fact, the promotional company, in this embodiment, is permitted to view information for only one of its clients at a time.

As mentioned above, in one embodiment, the Web interfaces by which program sponsors access application 135 over a network are customized. The program sponsor can customize the Web site any way it sees fit. As a part of setting up the carrier and packaging for the prepaid debit card and setting up the promotional campaign itself, how much customization the program sponsor wants on the site can also be specified. The look could be a standard configuration offered by the data processor, a standard promotional-company layout, or a product-specific look, for example.

As noted above, the URL that ends up getting printed on the card carrier is designed to match the consumer's setup information. That URL gets mapped back to the applicable promotion in the data processor's database so that when the consumer logs in, computer 100 can rapidly and efficiently paint the screen in the proper way.

In conclusion, the present invention provides, among other things, a method and system for gathering and reporting data associated with a cardholder's use of a prepaid debit card. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention as expressed in the claims.

What is claimed is:

1. A method for gathering and reporting data associated with a cardholder's use of a prepaid debit card, the method comprising:
   receiving primary personal data associated with the cardholder in connection with the issuance to the cardholder of the prepaid debit card;
   causing a financial institution to issue the prepaid debit card to the cardholder;
   causing a card fulfillment process to be performed for the cardholder;
   causing the prepaid debit card loaded with a predetermined monetary value to be distributed to the cardholder;
   receiving secondary personal data associated with the cardholder;
   processing one or more transactions initiated by the cardholder with the prepaid debit card;
   correlating, in a computerized data processing system, the primary and secondary personal data with transactional data associated with the one or more transactions to generate correlated data; and
   granting an authorized entity access to at least a portion of the correlated data on an aggregated and non-personally-identifiable basis; and
   generating and presenting to the authorized entity a report showing, based on aggregated and non-personally-identifiable correlated data associated with a plurality of cardholders, how successful a promotional campaign of a promotional entity is compared with a different promotional campaign conducted by a different entity without revealing to the authorized entity the identity of the different entity;
   wherein the prepaid debit card is offered to the cardholder by the promotional entity as an economic incentive.

2. The method of claim 1, wherein the promotional entity is a manufacturer and the economic incentive is a rebate offered by the manufacturer in connection with the cardholder's purchase of a particular product produced by the manufacturer.

3. The method of claim 1, wherein the promotional entity is a vendor and the economic incentive is a coupon offered to the cardholder by the vendor.

4. The method of claim 1, wherein the authorized entity is the promotional entity.

5. The method of claim 1, wherein the promotional entity is a promotional company that conducts an economic incentive campaign on behalf of a client of the promotional company.

6. The method of claim 1, further comprising:
   causing a predetermined amount to be funded on the prepaid debit card as a reward for the cardholder's purchasing, using the prepaid debit card, one of a product and a service from one of the promotional entity and a client of the promotional entity; and
   including, among the correlated data to which the authorized entity is granted access on an aggregated and non-personally-identifiable basis, a purchase by the cardholder, using the prepaid debit card, of one of a product and a service from one of the promotional entity and a client of the promotional entity.

7. The method of claim 1, wherein the primary personal data is derived from the cardholder's completion of a business reply card and the secondary personal data is derived from the cardholder's responses to a survey.

8. The method of claim 1, wherein the primary personal data includes name and address and the secondary personal data includes at least one of gender, household income range, age range, and marital status.

9. The method of claim 1, further comprising:
   including with the prepaid debit card, when the prepaid debit card is distributed to the cardholder, an advertisement for a product or service; and
   including, among the correlated data to which the authorized entity is granted access on an aggregated and non-personally-identifiable basis, a purchase by the cardholder, using the prepaid debit card, of the product or service.

10. The method of claim 1, further comprising:
    generating and presenting, to the authorized entity, a report including aggregated and non-personally-identifiable correlated data associated with a plurality of cardholders, the report being generated based on a plurality of filtering criteria interactively and dynamically selectable by the authorized entity.

11. The method of claim 10, wherein the plurality of filtering criteria include at least one of geographic region, age, gender, marital status, time period, and product or service category.

12. The method of claim 10, wherein the report compares first correlated data associated with a first time slice with second correlated data associated with a second time slice that is later in time than the first time slice.

13. The method of claim 10, further comprising:
    saving a set of parameters specifying the report;
    rerunning the report based on the saved set of parameters and presenting it to the authorized entity at a later time in response to a request from the authorized entity, the report being updated automatically to reflect current aggregated and non-personally-identifiable correlated data associated with a plurality of cardholders.

14. The method of claim 1, wherein the prepaid debit card is a general-purpose reloadable card.

15. The method of claim 14, wherein the authorized entity is a program manager and the method further comprises:
    generating and presenting, to the program manager, a report including aggregated and non-personally-identifiable correlated data associated with a plurality of cardholders, the report being generated based on a plurality of filtering criteria interactively and dynamically selectable by the program manager.

16. The method of claim 14, wherein the general-purpose reloadable card can be reloaded with monetary value by the cardholder.

17. The method of claim 14, wherein the general-purpose reloadable card is configured as a payroll card on which an employer of the cardholder can load at least one of standard compensation, bonuses, incentives, and rewards payments.

18. The method of claim 17, wherein the authorized entity is the employer and the method further comprises:
    generating and presenting to the employer a report including aggregated and non-personally-identifiable correlated data associated with a plurality of employees.

19. The method of claim 1, wherein the authorized entity is a third party with which the cardholder has not yet established a commercial relationship using the prepaid debit card.

20. A system for gathering and reporting data associated with a cardholder's use of a prepaid debit card, the system comprising:
    at least one processor; and
    a memory containing a plurality of program instructions configured to cause the at least one processor to:
        correlate, with transactional data associated with one or more processed transactions initiated by the cardholder using the prepaid debit card, primary and secondary personal data associated with the cardholder to generate correlated data, the primary personal data having been received in connection with issuance to the cardholder of the prepaid debit card by a financial institution, the cardholder having received the prepaid debit card following a card fulfillment process, the secondary personal information having been received following the cardholder's receipt of the prepaid debit card;

grant an authorized entity access to at least a portion of the correlated data on an aggregated and non-personally-identifiable basis; and generate and present to the authorized entity a report showing, based on aggregated and non-personally-identifiable correlated data associated with a plurality of cardholders, how successful a promotional campaign of a promotional entity is compared with a different promotional campaign conducted by a different entity without revealing to the authorized entity the identity of the different entity;

wherein the prepaid debit card is offered to the cardholder by the promotional entity as an economic incentive.

21. A computer-readable storage medium containing a plurality of program instructions executable by a processor for gathering and reporting data associated with a cardholder's use of a prepaid debit card, the plurality of program instructions comprising:

a first instruction segment configured to correlate, with transactional data associated with one or more processed transactions initiated by the cardholder using the prepaid debit card, primary and secondary personal data associated with the cardholder to generate correlated data, the primary personal data having been received in connection with issuance to the cardholder of the prepaid debit card by a financial institution, the cardholder having received the prepaid debit card following a card fulfillment process, the secondary personal information having been received following the cardholder's receipt of the prepaid debit card;

a second instruction segment configured to grant an authorized entity access to at least a portion of the correlated data on an aggregated and non-personally-identifiable basis; and a third instruction segment configured to generate and present to the authorized entity a report showing, based on aggregated and non-personally-identifiable correlated data associated with a plurality of cardholders, how successful a promotional campaign of a promotional entity is compared with a different promotional campaign conducted by a different entity without revealing to the authorized entity the identity of the different entity;

wherein the prepaid debit card is offered to the cardholder by the promotional entity as an economic incentive.

* * * * *